July 22, 1947.  H. H. ENGEMANN  2,424,389
TORSION SPRING ASSEMBLY FOR AUTOMATIC PUSH RODS
Filed June 2, 1944
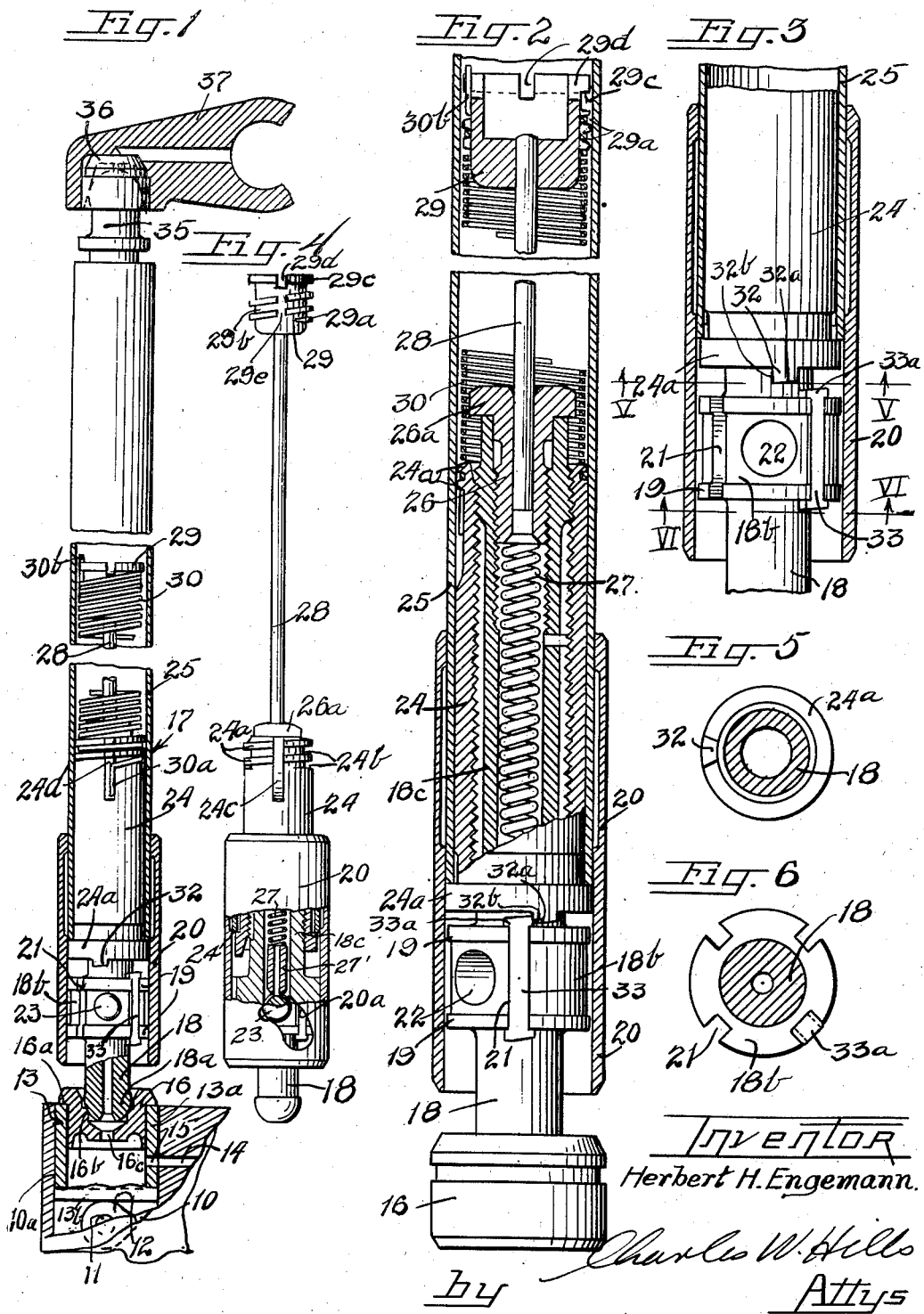
Inventor
Herbert H. Engemann.
by Charles W. Hills
Attys Patented July 22, 1947

2,424,389

UNITED STATES PATENT OFFICE 2,424,389

TORSION SPRING ASSEMBLY FOR AUTOMATIC PUSH RODS

Herbert H. Engemann, Cleveland Heights, Ohio

Application June 2, 1944, Serial No. 538,456

8 Claims. (Cl. 123—90)

1

This invention relates to extensible and contractable links especially adapted for the valve linkages of internal combustion engines and more specifically relates to torsion spring assemblies for automatic push rods which control movement of threaded-together push rod parts.

The invention will hereinafter be specifically described as embodied in a push rod mounted between the cam follower and rocker arm of a valve assembly for an internal combustion engine but the principles of this invention are generally applicable to torsion spring assemblies.

According to this invention an automatic push rod is provided with a threaded-together stud and nut assembly. The stud carries a torsion spring anchor in spaced longitudinal relation therefrom. The nut has a torsion spring anchor thereon. A torsion spring secured to these anchors acts on the stud and nut to reversely rotate the same for lengthening the push rod assembly. The torsion spring anchor carried by the stud has a stop shoulder thereon limiting the amount of unscrewing of the stud out of the nut to control the maximum elongation of the rod. The stud also carries a stop pin coacting with a stop shoulder or abutment on the nut to limit the amount of threading of the stud into the nut for controlling the minimum lengh of the push rod.

A sleeve or inertia hammer is slidably carried by the push rod assembly and acts on a pin carried by the stud to rotate the stud against the action of the torsion spring for shortening the assembly.

A feature of the invention resides in the use of a removable pin which is selectively seated on the stud to coact with the stop member on the nut.

Another feature of the invention deals with a stop device for a threaded-together assembly which limits the threading movement but is arranged to prevent any wedging action, so that the threaded members can always be freely rotated.

A further feature of the invention deals with the provision of anchor threads and slots which receive the end coils of a torsion spring and coact therewith to provide a wedge lock for the spring.

An object of the invention is to provide an anchor for a coil spring which has one or more coils of the spring in threaded relation therewith together with an end tab of the spring locking the received coils against free sliding movement in the thread so that a wedge lock will be obtained when the spring is stressed.

A further object of the invention is to provide a spring anchor including a helical groove for

2 receiving one or more coils of a spring and a receptacle for a free end of the spring to hold the received coils against free sliding action in the groove to maintain a wedge lock of the coils in the groove whenever the spring is subjected to torsion loads.

A still further object of the invention is to provide stops for torsion spring-impelled rotary members, which stops are arranged for eliminating wedging engagement between the parts to insure free rotation of the parts.

A still further object of the invention is to provide torsion spring anchors and locks for automatic push rods.

A still further object of the invention is to provide a stop pin assembly adapted to be selectively seated on a rotary member to coact with an adjacent member.

A specific object of the invention is to provide a stop pin arrangement for threaded-together parts wherein one part carries a pin for coacting with a projecting lug on the other part, and wherein this pin is selectively seated so that it will clear the lug on the next to the last rotation, but will firmly strike the lug on the last rotation.

Other and further objects of the invention will be apparent to those skilled in the art from the following detailed description of the annexed sheet of drawings which, by way of preferred example only, illustrates one embodiment of the invention.

On the drawings:

Figure 1 is a broken fragmentary side elevational view, with parts in vertical cross section, of a valve linkage including an automatic push rod according to this invention.

Figure 2 is a broken fragmentary enlarged vertical cross-sectional view, with parts in elevation, of a portion of the push rod of Figure 1.

Figure 3 is a view of the lower parts of the push rod of Figure 2 but illustrating the parts in another position.

Figure 4 is a side elevational view of a sub-assembly of the push rod.

Figure 5 is a horizontal cross-sectional view, with parts omitted, taken along the line V—V of Figure 3.

Figure 6 is a horizontal cross-sectional view, with parts omitted, taken along the line VI—VI of Figure 3.

As shown on the drawings:

In Figure 1 the reference numeral 10 designates generally a body of an internal combustion engine containing a cam shaft 11 with a cam 12 thereon. The body 10 has a bore 10a therein in which is slidably mounted the side wall 13a of a cam follower 13. The cam follower is hollow and has a bottom wall 13b acted on by the cam 12 to be raised and lowered in the bore 10a.

A duct 14 in the body 10 communicates with an aperture 15 in the side wall 13a of the cam follower to supply lubricant to the interior of the follower. A cup member 16 is disposed in the open top end of the cam follower and has a shoulder 16a seated on top of the cam follower. The cup member 16 has a fragmental ball seat 16b therein. A bore 16c is provided in the bottom of the cup to join the ball seat portion thereof with the interior of the cam follower for feeding lubricant to the seat.

A push rod 17 according to this invention has a bottom stud 18 with a segmental ball end 18a seated on the ball seat 16b.

The stud 18 has an enlarged cylindrical portion 18b in spaced relation from the ball end 18a thereof and this cylindrical portion has rim top and bottom ends 19 slidably receiving thereover a sleeve 20. A plurality of longitudinal grooves 21 are provided at spaced intervals around the enlarged portion 18b, four such grooves being shown in Figure 6.

The enlarged portion 18b has a transverse bore 22 therethrough freely receiving an impact pin 23 which extends into slots 20a of the sleeve 20. The sleeve is thus suspended from the cylindrical portion 18b of the stud on the pin 23.

The stud 18 has a cylindrical shank portion 18c extending from the enlarged portion 18b and, as shown in Figure 2, this portion is externally threaded into an elongated cylindrical nut 24 having a head 24a providing a shoulder which bottoms a tube 25.

The stud 18 is hollow and is interiorly threaded at the upper end thereof for receiving a bushing 26 with a head 26a bottomed on the upper end of the shank 18c. A coil spring 27 is disposed in the hollow shank portion 18c of the stud and held under compression by the bushing 26. The spring 27 acts on a plunger member 27' as is illustrated in Figure 4, which seats in a groove in the central portion of the pin 23 to hold the pin against endwise movement.

The bushing 26 carries a rod 28 which is welded thereto. The upper end of the rod, as best shown in Figures 2 and 4, carries in fixed relation thereon a head member 29. This head member 29 has several turns of a helical thread 29a therearound providing a helical groove 29b. The member 29 has an outturned collar 29c around the upper end thereof which is slotted at spaced intervals therearound as at 29d.

As shown in Figure 4, the thread 29a can also have gaps 29e at spaced intervals therein preferably aligned with the slots 29d.

The top end of the nut 24a has several turns of a thread 24a therearound defining a helical groove 24b. Longitudinal slots 24c are provided through the thread and continue into the cylindrical portion of the nut as shown in Figure 4.

A torsion spring 30 (Figures 1 and 2) has an end coil or two thereof seated in the helical groove 24b provided by the thread 24a on the nut 24 together with an outturned free end portion 30a seated in a slot 24c. The top end of the torsion spring has several end coils thereof seated in the groove 29b of the anchor member 29, and has a free end portion 30b seated in a slot 29d.

The thread type anchors receive one or more end coils of the torsion spring while the slots at right angles to the threads receive bent free end portions of the coil spring. The free end portions prevent the coils seated in the grooves provided by the threads from unscrewing out of the threads. When the spring is loaded, the torsional pull on the coils seated in the thread grooves tighten these coils on the anchors thereby adding a friction grip. The anchor arrangement thus develops its own friction grip and, since one or more complete end coils of the spring are included in the friction grips, the spring is not unduly stressed and will not break at the anchors.

As explained above, the enlarged portion 18b of the stud 18 has four longitudinal slots 21 at equally spaced intervals therearound. The head 24a of the nut adjacent this enlarged portion 18b of the stud has an integral depending lug 32 thereon with an inclined bottom face 32a and a vertical front face 32b.

A pin 33 is seated in one of the grooves 21 and this pin has a head 33a projecting above the top of the enlarged portion 18b and having an inclined top wall and a vertical front wall.

The pin 33 is placed in a slot 21 which permits the head 33a to ride under the inclined face 32a of the lug 32 on one turn of the stud into the nut and then causes the vertical wall of this head to strike the front face 32b of the lug on the next turn of the stud. In other words, a groove 21 is selected for the pin 33 to position the pin so that it will clear the lug 32 on next to the last revolution of the stud 18 as it is screwed into the nut 24 and will fully strike the lug on the last revolution. This arrangement prevents wedging of the stud in the nut, that is wedging between the lug 32 and the pin 33 when, for example, the sleeve 20 rapidly rotates the threaded assembly so that the stud is screwed into the nut with considerable force. The vertical abutting faces of the pin head and the lug will, of course, eliminate any wedge lock as the lug 32 and pin 33 cooperate through the abutting vertical wall of the head 33a and face 32b of the lug. The pin 33 has a press fit in the selected groove 21 or it can be otherwise secured in the selected groove.

The pin and lug limit the threading together of the stud and nut. The head 26a of the bushing 26 on the stud will strike against the end face of the nut when the stud and nut are unthreaded thereby limiting the unthreading movement.

From the above descriptions it will be understood that the push rods of this invention have threaded-together nut and stud assemblies with a torsion spring loaded to unthread the assembly for lengthening the push rod. An inertia hammer developed through the momentum of the sleeve 20 upon movement of the rod acts on an impact pin 23 carried by the stud of the assembly through the curved slots 20a to thread the stud into the nut for shortening the push rod. The torsion spring has the ends thereof anchored by arrangements which eliminate breakage of the spring since the spring coils form their own locks. Stop devices provided on opposed ends of the stud coact with opposed ends of the nut to limit the movement of the stud in the nut without permitting binding or wedging action.

The impact hammer or sleeve 20 slides on the tube 25 of the push rod and also on the head 24a of the nut and the rim ends 19, 19 of the enlarged cylindrical portion 18b of the stud 18.

The push rod 17 has a ball ended stud 35 projecting from the top end thereof as best shown in Figure 1 seated in a ball cup 36 carried in a rocker arm 37 for a poppet valve (not shown).

When the cam 12 raises the cam follower 13 the push rod 17 is raised and acts as a rigid member to tilt the rocker arm 37 for opening the poppet valve. At about half open valve position the push rod is decelerated and continues to raise at decreasing speeds. This deceleration does not affect the hammer 20 which is free to fly upward on the pin 23. Thus during the first part of the upstroke when the valve gains speed in an upward direction, the impact pin 23 remains in the top part of the slots 20a. At about the half way open position for maximum upward speed, the valve starts to lose speed in an upward direction and during this latter half of the upward movement the hammer or sleeve 20 slides upwardly. During this negative acceleration, the valve spring force keeps the valve linkage in contact with the cam, but the inertia hammer is free to slide upwardly. On the down stroke the push rod is accelerated downwardly until about half closed valve position and the hammer then flies downwardly to deliver a rotative blow to the pin due to the curvature at the upper ends of the slots 20a. This rotative blow threads the stud 18 into the nut 24 to wind up torsion spring 30 and shorten the rod. After the valve is fully seated the torsion spring reversely rotates the stud and nut for lengthening the push rod to take up any undesired clearances which may have developed in the linkage.

The push rods thus automatically lengthen and shorten during operation to maintain a predetermined clearance in the valve linkage.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a linkage assembly, an automatically extensible and contractable link including threaded-together male and female parts, a torsion spring to reversely rotate the parts for lengthening the link, and an inertia hammer for rotating the male part to shorten the link, the improvements of threads in said link defining helical grooves receiving the ends of the torsion spring to anchor the spring, and opposed abutment means on the male member adapted to thrust against the opposed ends of the female member for limiting the relative movements of the male and female members.

2. In a valve linkage including a link having threaded-together male and female parts and a torsion spring for reversely rotating said parts to lengthen the link, the improvements of opposed threads carried by the male and female members in spaced axial relation, a helically coiled torsion spring having end coils respectively lying in the helical grooves between said opposed threads, said end coils being movable in said grooves in the unstressed condition of said torsion spring, means holding the ends of said spring against rotational movement, whereby torsional stressing of said spring tightens said end coils in gripping relation in said helical grooves, said female member having a depending abutment on an end face thereof, said male member having a head portion adapted to clear the abutment on one revolution and strike a side face of the abutment on the next revolution into the female member.

3. An automatically adjustable push rod comprising a nut, a hollow stud threaded in said nut, a bushing threaded in said stud, a rod carried by said bushing extending from the stud and nut into spaced relation from the ends thereof, a spring anchor secured on said rod, a spring anchor on said nut, a torsion spring having the ends thereof secured to said spring anchors, and means providing an abutment shoulder on said bushing for thrusting against the nut to limit the extent of relative longitudinal movement of the nut and stud.

4. A push rod assembly including threaded-together male and female parts, a depending lug on the female part, a plurality of longitudinal grooves on the male part adjacent said lug, a pin selectively seated in one of said grooves having a head adapted to clear the lug on one revolution of the stud into the nut and strike a side face of the lug on the next revolution to limit relative movement of the male and female parts without wedging.

5. An extensible link comprising a nut having internal and external threads, a stud threaded through said nut on said internal threads, an externally threaded member carried by said stud in longitudinally spaced relation from the nut, a torsion spring having coils on the ends thereof threaded on said external threads and free end portions projecting at an angle to the coils, and receptacles for said free end portions on said nut and said threaded member carried by the stud holding the coils from unscrewing out of the threads whereby torsion loads on the spring will tighten the coils in the threads and will urge the stud and nut in opposite rotative directions to lengthen the link.

6. An extensible and contractable link comprising threaded-together male and female members, said female member having opposed end faces, a lug extending from one end face, said male member extending beyond the end faces of the female member, heads on both extending portions of the male member, the head adjacent the lug having a plurality of peripheral longitudinal grooves, a headed pin seated in that groove which will permit the head to just clear the lug on one revolution of the male member but will position the head to strike a side face of the lug on the next revolution and thereby limit the threading of the male member into the female member to shorten the link while said other head limits the threading of the male member out of the female member to lengthen the link.

7. A push rod comprising a nut, a stud threaded therethrough, a torsion spring acting on the stud and nut to lengthen the push rod, an inertia hammer acting on the stud to thread it into the nut and shorten the push rod, an abutment member on said nut having a generally radial striking face, a plurality of longitudinal grooves spaced around the periphery of said stud adjacent said abutment member, a pin selectively seated in one of said grooves having a head adapted to clear said abutment member on one revolution of the stud into the nut and strike said striking face of said abutment member on the next revolution to limit relative movement of said stud and nut in the direction to shorten said push rod without wedging action, whereby the frictional resistance to the action of said torsion spring is substantially decreased.

8. A push rod assembly including threaded-together male and female parts, a depending lug on the female part having a generally radial side face, a plurality of longitudinal grooves spaced around the periphery of the male part adjacent said lug, a pin selectively seated in one of said grooves having a head adapted to clear the lug on one revolution of the male part into the female part and strike said side face of the lug on the next revolution to limit relative movement of the male and female parts without wedging.

HERBERT H. ENGEMANN.

REFERENCES CITED

The following references are of record in the file of this patent:

UNITED STATES PATENTS

| Number | Name | Date |
|---|---|---|
| 2,176,895 | Engemann | Oct. 14, 1939 |
| 2,050,766 | Russell | Aug. 11, 1936 |
| 1,443,940 | Anderson | Feb. 6, 1923 |
| 1,607,128 | Johansen | Nov. 16, 1926 |
| 1,817,620 | Hamilton | Aug. 4, 1931 |
| 2,118,450 | Zahodiakin | May 24, 1938 |
| 2,131,507 | Goodwin | Sept. 27, 1938 |
| 1,930,261 | Berry | Oct. 10, 1933 |
| 1,485,036 | Kingsley | Feb. 26, 1924 |
| 298,016 | Moore | May 6, 1884 |